(12) United States Patent
Ziegler et al.

(10) Patent No.: US 11,633,884 B2
(45) Date of Patent: *Apr. 25, 2023

(54) METHOD OF MANUFACTURING A LAYER

(71) Applicant: VALINGE INNOVATION AB, Viken (SE)

(72) Inventors: Göran Ziegler, Viken (SE); Marcus Bergelin, Lerberget (SE); Jan Jacobsson, Landskrona (SE); Melker Ryberg, Malmö (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,868

(22) Filed: May 24, 2016

(65) Prior Publication Data

US 2016/0368180 A1 Dec. 22, 2016

Related U.S. Application Data

(63) Continuation of application No. 13/445,379, filed on Apr. 12, 2012, now Pat. No. 9,352,499.

(Continued)

(51) Int. Cl.
*B29C 41/28* (2006.01)
*E04F 15/10* (2006.01)
(Continued)

(52) U.S. Cl.
CPC .............. *B29C 41/28* (2013.01); *C08L 61/28* (2013.01); *E04F 15/102* (2013.01);
(Continued)

(58) Field of Classification Search
CPC .. B29C 41/28; B29K 2105/246; E04F 15/102
See application file for complete search history.

(56) References Cited

U.S. PATENT DOCUMENTS 2,231,953 A 2/1941 Ruzicka
2,587,064 A 2/1952 Rapson
(Continued)

FOREIGN PATENT DOCUMENTS

AU 80284/75 6/1975
CA 2 557 096 A1 7/2005
(Continued)

OTHER PUBLICATIONS

Rudolf Patt et al. "Paper and Pulp," in Ullmann's Encyclopedia of Industrial Chemistry, 157 pages, published online 2000.*
(Continued)

*Primary Examiner* — Jane L Stanley
(74) *Attorney, Agent, or Firm* — Buchanan Ingersoll & Rooney P.C.

(57) ABSTRACT

A method of manufacturing a separate and continuous layer being essentially uncured. The method includes applying a powder mix including fibres and a thermosetting binder on a carrier, forming a powder mix layer, wherein the powder mix is connected together such that the powder mix layer is obtained and wherein the powder mix layer is essentially uncured, and releasing the powder mix layer from the carrier. Also, a layer and a method for manufacturing a building panel.

30 Claims, 6 Drawing Sheets

Related U.S. Application Data

(60) Provisional application No. 61/557,734, filed on Nov. 9, 2011, provisional application No. 61/474,485, filed on Apr. 12, 2011, provisional application No. 61/474,498, filed on Apr. 12, 2011.

(51) Int. Cl.
*C08L 61/28* (2006.01)
*B29K 101/10* (2006.01)
*B29K 105/24* (2006.01)
*B29L 7/00* (2006.01)

(52) U.S. Cl.
CPC .... *B29K 2101/10* (2013.01); *B29K 2105/246* (2013.01); *B29L 2007/008* (2013.01)

(56) References Cited

U.S. PATENT DOCUMENTS

| | | | |
|---|---|---|---|
| 2,831,793 A | 4/1958 | Elmendorf | |
| 2,962,081 A | 11/1960 | Dobry et al. | |
| 3,032,820 A | 5/1962 | Johnson | |
| 3,135,643 A | 6/1964 | Michl | |
| 3,164,648 A | 1/1965 | Franksson | |
| 3,286,006 A | 11/1966 | Annand | |
| 3,308,013 A | 3/1967 | Bryant | |
| 3,325,302 A | 6/1967 | Hosfeld | |
| 3,342,621 A | 9/1967 | Point et al. | |
| 3,345,234 A | 10/1967 | Jecker et al. | |
| 3,373,070 A | 3/1968 | Fuerst | |
| 3,426,730 A | 2/1969 | Lawson et al. | |
| 3,463,653 A | 8/1969 | Letter | |
| 3,486,484 A | 12/1969 | Bullough | |
| 3,533,725 A | 10/1970 | Bridgeford | |
| 3,540,978 A | 11/1970 | Ames | |
| 3,565,665 A | 2/1971 | Stranch et al. | |
| 3,647,500 A | 3/1972 | Mizuno | |
| 3,673,020 A | 6/1972 | De Jaeger | |
| 3,674,619 A * | 7/1972 | Scher | B44C 3/08 101/28 |
| 3,793,125 A | 2/1974 | Kunz | |
| 3,846,219 A | 11/1974 | Kunz | |
| 3,880,687 A | 4/1975 | Elmendorf et al. | |
| 3,897,185 A | 7/1975 | Beyer | |
| 3,897,588 A | 7/1975 | Nohtomi | |
| 3,914,359 A | 10/1975 | Bevan | |
| 3,931,428 A | 1/1976 | Reick | |
| 3,961,108 A | 6/1976 | Rosner et al. | |
| 3,975,483 A * | 8/1976 | Rudloff | B29C 70/00 264/137 |
| 4,035,215 A * | 7/1977 | Goldstone | B29C 43/203 156/245 |
| 4,052,739 A | 10/1977 | Wada et al. | |
| 4,093,766 A | 6/1978 | Scher et al. | |
| 4,131,705 A | 12/1978 | Kubinsky | |
| 4,255,480 A | 3/1981 | Scher | |
| 4,313,857 A | 2/1982 | Blount | |
| 4,337,290 A | 6/1982 | Kelly et al. | |
| 4,400,705 A | 8/1983 | Horike | |
| 4,420,525 A | 12/1983 | Parks | |
| 4,430,375 A | 2/1984 | Scher et al. | |
| 4,474,920 A | 10/1984 | Kyminas et al. | |
| 4,890,656 A | 1/1990 | Ohsumi et al. | |
| 5,034,272 A | 7/1991 | Lindgren et al. | |
| 5,134,026 A | 7/1992 | Melcher | |
| 5,206,066 A | 4/1993 | Horacek | |
| 5,246,765 A | 9/1993 | Lussi | |
| 5,258,216 A | 11/1993 | Von Bonin et al. | |
| 5,266,384 A | 11/1993 | O'Dell | |
| 5,314,554 A | 5/1994 | Owens | |
| 5,405,681 A | 4/1995 | Nakayama et al. | |
| 5,405,705 A | 4/1995 | Fujimoto et al. | |
| 5,422,170 A | 6/1995 | Iwata et al. | |
| 5,466,511 A | 11/1995 | O'Dell et al. | |
| 5,543,193 A | 8/1996 | Tesch | |
| 5,569,424 A | 10/1996 | Amour | |
| 5,601,930 A | 2/1997 | Mehta | |
| 5,604,025 A | 2/1997 | Tesch | |
| 5,609,966 A | 3/1997 | Perrin et al. | |
| 5,670,237 A | 9/1997 | Shultz et al. | |
| 5,766,522 A | 6/1998 | Daly et al. | |
| 5,827,788 A | 10/1998 | Miyakoshi | |
| 5,855,832 A | 1/1999 | Clausi | |
| 5,865,003 A | 2/1999 | Klett | |
| 5,891,564 A | 4/1999 | Shultz et al. | |
| 5,925,296 A | 7/1999 | Leese | |
| 5,942,072 A | 8/1999 | McKinnon | |
| 6,036,137 A | 3/2000 | Myren | |
| 6,103,377 A | 8/2000 | Clausi | |
| 6,238,750 B1 | 5/2001 | Correll et al. | |
| 6,324,809 B1 | 12/2001 | Nelson | |
| 6,403,857 B1 * | 6/2002 | Gross | A61F 13/534 604/365 |
| 6,468,645 B1 | 10/2002 | Clausi | |
| 6,521,326 B1 | 2/2003 | Fischer et al. | |
| 6,537,610 B1 | 3/2003 | Springer et al. | |
| 6,617,009 B1 | 9/2003 | Chen | |
| 6,620,349 B1 | 9/2003 | Lopez | |
| 6,652,695 B1 | 11/2003 | Von Der Heide et al. | |
| 6,666,951 B1 * | 12/2003 | Kostiw | B27N 1/00 156/62.4 |
| 6,769,217 B2 | 8/2004 | Nelson | |
| 6,773,799 B1 | 8/2004 | Persson et al. | |
| 6,803,110 B2 | 10/2004 | Drees et al. | |
| 6,926,954 B2 | 8/2005 | Schuren et al. | |
| 6,991,830 B1 | 1/2006 | Hansson | |
| 7,022,756 B2 | 4/2006 | Singer | |
| 7,485,693 B2 | 2/2009 | Matsuda et al. | |
| 7,811,489 B2 | 10/2010 | Pervan | |
| 8,349,234 B2 | 1/2013 | Ziegler et al. | |
| 8,349,235 B2 | 1/2013 | Pervan et al. | |
| 8,419,877 B2 | 4/2013 | Pervan et al. | |
| 8,431,054 B2 | 4/2013 | Pervan et al. | |
| 8,480,841 B2 | 7/2013 | Pervan et al. | |
| 8,481,111 B2 | 7/2013 | Ziegler et al. | |
| 8,617,439 B2 | 12/2013 | Pervan et al. | |
| 8,663,785 B2 | 3/2014 | Ziegler et al. | |
| 8,728,564 B2 | 5/2014 | Ziegler et al. | |
| 8,784,587 B2 | 7/2014 | Lindgren et al. | |
| 8,920,874 B2 | 12/2014 | Ziegler et al. | |
| 8,920,876 B2 | 12/2014 | Vetter et al. | |
| 8,973,270 B2 | 3/2015 | Siebert et al. | |
| 8,993,049 B2 | 3/2015 | Pervan | |
| 9,085,905 B2 | 7/2015 | Persson et al. | |
| 9,181,698 B2 | 11/2015 | Pervan et al. | |
| 9,255,405 B2 | 2/2016 | Pervan et al. | |
| 9,296,191 B2 | 3/2016 | Pervan et al. | |
| 9,352,499 B2 * | 5/2016 | Ziegler | B29C 41/28 |
| 9,403,286 B2 | 8/2016 | Vetter et al. | |
| 9,410,319 B2 | 8/2016 | Ziegler et al. | |
| 9,556,622 B2 | 1/2017 | Pervan et al. | |
| 9,573,343 B2 | 2/2017 | Pervan | |
| 9,738,095 B2 | 8/2017 | Pervan | |
| 9,757,928 B2 | 9/2017 | Pervan et al. | |
| 9,783,996 B2 | 10/2017 | Pervan et al. | |
| 10,017,950 B2 | 7/2018 | Pervan | |
| 10,100,535 B2 | 10/2018 | Pervan et al. | |
| 10,214,913 B2 | 2/2019 | Persson et al. | |
| 10,286,633 B2 | 5/2019 | Lundblad et al. | |
| 10,307,984 B2 | 6/2019 | Pervan | |
| 10,315,219 B2 | 6/2019 | Jacobsson | |
| 10,344,379 B2 | 7/2019 | Pervan et al. | |
| 10,364,578 B2 | 7/2019 | Pervan | |
| 10,392,812 B2 | 8/2019 | Pervan | |
| 10,442,152 B2 | 10/2019 | Schulte | |
| 10,442,164 B2 | 10/2019 | Schulte | |
| 10,493,729 B2 | 12/2019 | Pervan et al. | |
| 10,513,094 B2 | 12/2019 | Persson et al. | |
| 10,800,186 B2 | 10/2020 | Pervan et al. | |
| 10,828,881 B2 | 11/2020 | Bergelin et al. | |
| 10,857,765 B2 | 12/2020 | Schulte | |
| 10,899,166 B2 | 1/2021 | Pervan et al. | |
| 10,913,176 B2 | 2/2021 | Lindgren et al. | |
| 10,926,509 B2 | 2/2021 | Schulte | |

(56) References Cited

U.S. PATENT DOCUMENTS

| | | |
|---|---|---|
| 10,967,608 B2 | 4/2021 | Pervan |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 11,235,565 B2 | 2/2022 | Pervan et al. |
| 2001/0006704 A1 | 7/2001 | Chen et al. |
| 2001/0009309 A1 | 7/2001 | Taguchi et al. |
| 2002/0054994 A1 | 5/2002 | Dupre et al. |
| 2002/0100231 A1 | 8/2002 | Miller |
| 2002/0155297 A1 | 10/2002 | Shuren |
| 2003/0021915 A1 | 1/2003 | Rohatgi et al. |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0119987 A1 | 6/2003 | Eadara et al. |
| 2003/0129361 A1 | 7/2003 | Plug |
| 2003/0208980 A1 | 11/2003 | Miller et al. |
| 2003/0233809 A1 | 12/2003 | Pervan |
| 2004/0086678 A1 | 5/2004 | Chen et al. |
| 2004/0123542 A1 | 7/2004 | Grafenauer |
| 2004/0169710 A1 | 9/2004 | Ide |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0247831 A1 | 12/2004 | Nakagawa |
| 2004/0250911 A1 | 12/2004 | Vogel |
| 2005/0003099 A1 | 1/2005 | Quist |
| 2005/0079780 A1 | 4/2005 | Rowe et al. |
| 2005/0093194 A1 | 5/2005 | Oriakhi |
| 2005/0193677 A1 | 9/2005 | Vogel |
| 2005/0249929 A1 | 11/2005 | Reichwein et al. |
| 2005/0250879 A1 | 11/2005 | Correll et al. |
| 2005/0252130 A1 | 11/2005 | Martensson |
| 2006/0005498 A1 | 1/2006 | Sabater et al. |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0142433 A1 | 6/2006 | Rivers |
| 2006/0145384 A1 | 7/2006 | Singer |
| 2006/0156672 A1 | 7/2006 | Laurent et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0159814 A1 | 7/2007 | Jacobsson |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0243359 A1 | 10/2007 | Petersen |
| 2007/0256804 A1 | 11/2007 | Garcis Espino et al. |
| 2007/0295446 A1 | 12/2007 | Behr et al. |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0176039 A1 | 7/2008 | Chen et al. |
| 2008/0263985 A1 | 10/2008 | Hasch et al. |
| 2009/0031662 A1 | 2/2009 | Chen |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0139170 A1 | 6/2009 | Thiers |
| 2009/0145066 A1 | 6/2009 | Pervan |
| 2009/0155612 A1* | 6/2009 | Pervan .................. B32B 21/02 428/498 |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0066121 A1* | 3/2010 | Gross .................. G10K 11/162 296/146.5 |
| 2010/0092731 A1 | 4/2010 | Pervan et al. |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0307675 A1 | 12/2010 | Buhlmann |
| 2010/0307677 A1 | 12/2010 | Buhlmann |
| 2010/0310893 A1 | 12/2010 | Derbyshire |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0189471 A1 | 8/2011 | Ziegler |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0283642 A1 | 11/2011 | Meirlaen et al. |
| 2011/0283650 A1 | 11/2011 | Pervan et al. |
| 2011/0293823 A1 | 12/2011 | Bruderer et al. |
| 2011/0293906 A1 | 12/2011 | Jacobsson |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0288689 A1 | 11/2012 | Hansson et al. |
| 2012/0308774 A1 | 12/2012 | Håkansson et al. |
| 2013/0065072 A1 | 3/2013 | Pervan |
| 2013/0092314 A1 | 4/2013 | Ziegler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0017452 A1 | 1/2014 | Pervan |
| 2014/0044872 A1 | 2/2014 | Pervan |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199513 A1 | 7/2014 | Pervan et al. |
| 2014/0199558 A1 | 7/2014 | Pervan et al. |
| 2014/0234531 A1 | 8/2014 | Ziegler et al. |
| 2014/0255670 A1 | 9/2014 | Kalwa |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2015/0343739 A1 | 12/2015 | Pervan |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0303868 A1 | 10/2016 | Hansson et al. |
| 2016/0369507 A1 | 12/2016 | Pervan |
| 2016/0375674 A1 | 12/2016 | Schulte |
| 2017/0120558 A1 | 5/2017 | Pervan |
| 2017/0120564 A1 | 5/2017 | Schulte |
| 2017/0165936 A1 | 6/2017 | Schulte |
| 2017/0190156 A1 | 7/2017 | Ziegler et al. |
| 2017/0232761 A1 | 8/2017 | Pervan et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |

(56) References Cited

U.S. PATENT DOCUMENTS

| | | |
|---|---|---|
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0248108 A1 | 8/2019 | Pervan |
| 2019/0277039 A1 | 9/2019 | Persson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0078305 A1 | 3/2021 | Schulte |
| 2021/0101310 A1 | 4/2021 | Lindgren et al. |
| 2021/0129485 A1 | 5/2021 | Pervan |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |

FOREIGN PATENT DOCUMENTS

| | | |
|---|---|---|
| CH | 298894 A | 5/1954 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 101 56 956 A1 | 6/2003 |
| DE | 202 14 532 U1 | 2/2004 |
| DE | 103 31 657 A1 | 2/2005 |
| DE | 20 2004 003 061 U1 | 7/2005 |
| DE | 10 2004 050 278 A1 | 4/2006 |
| DE | 10 2005 046 264 A1 | 4/2007 |
| DE | 20 2006 007 797 U1 | 8/2007 |
| DE | 10 2006 024 593 A1 | 12/2007 |
| DE | 10 2007 046 532 B3 | 10/2008 |
| DE | 10 2010 045 266 A | 3/2012 |
| EP | 0 129 430 A2 | 12/1984 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 1 035 255 A1 | 9/2000 |
| EP | 1 125 971 A1 | 8/2001 |
| EP | 1 136 251 A2 | 9/2001 |
| EP | 1 193 288 A1 | 4/2002 |
| EP | 1 209 199 A1 | 5/2002 |
| EP | 1 242 702 A1 | 9/2002 |
| EP | 1 249 322 A1 | 10/2002 |
| EP | 1 454 763 A2 | 9/2004 |
| EP | 1 242 702 B1 | 11/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 749 676 A1 | 2/2007 |
| EP | 1 847 385 A1 | 10/2007 |
| EP | 1 961 556 A1 | 8/2008 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 106 903 A1 | 10/2009 |
| EP | 2 213 476 A1 | 8/2010 |
| EP | 2 226 201 A1 | 9/2010 |
| EP | 2 246 500 A2 | 11/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| FR | 2 873 953 A1 | 2/2006 |
| GB | 984 170 A | 2/1965 |
| GB | 1090450 | 11/1967 |
| GB | 2 248 246 A | 4/1992 |
| JP | 2-229002 A | 9/1990 |
| JP | H05-162230 A | 6/1993 |
| JP | 11-291203 A | 10/1999 |
| JP | 2001-287208 A | 10/2001 |
| JP | 2002-001748 A | 1/2002 |
| JP | 2003-311717 A | 11/2003 |
| JP | 2003-311718 A | 11/2003 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| NZ | 225556 A1 | 2/1992 |
| SE | 469 326 B | 6/1993 |
| WO | WO 89/03753 A1 | 5/1989 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 00/53380 A1 | 9/2000 |
| WO | WO 01/00409 A1 | 1/2001 |
| WO | WO 01/48333 A1 | 7/2001 |
| WO | WO 01/64408 A1 | 9/2001 |
| WO | WO 01/68367 A1 | 9/2001 |
| WO | WO 01/74605 A2 | 10/2001 |
| WO | WO 01/74605 A3 | 10/2001 |
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/067874 A2 | 8/2004 |
| WO | WO 2005/010296 A1 | 2/2005 |
| WO | WO 2005/054600 A1 | 6/2005 |
| WO | WO 2005/066431 A2 | 7/2005 |
| WO | WO 2005/080096 A1 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/002733 A1 | 1/2006 |
| WO | WO 2006/007413 A1 | 1/2006 |
| WO | WO 2006/013469 A1 | 2/2006 |
| WO | WO 2006/015313 A2 | 2/2006 |
| WO | WO 2006/042651 A1 | 4/2006 |
| WO | WO 2006/043893 A1 | 4/2006 |
| WO | WO 2006/066776 A2 | 6/2006 |
| WO | WO 2006/126930 A1 | 11/2006 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2004/050359 A1 | 6/2007 |
| WO | WO 2008/004960 A2 | 1/2008 |

(56) References Cited

FOREIGN PATENT DOCUMENTS

| | | | |
|---|---|---|---|
| WO | WO 2008/004960 A3 | 1/2008 | |
| WO | WO 2008/004960 A8 | 1/2008 | |
| WO | WO 2008/057390 A2 | 5/2008 | |
| WO | WO 2008/057390 A3 | 5/2008 | |
| WO | WO 2008/148771 A1 | 12/2008 | |
| WO | WO 2009/065768 A1 | 5/2009 | |
| WO | WO 2009/065769 A2 | 5/2009 | |
| WO | WO 2009/065769 A3 | 5/2009 | |
| WO | WO-2009065769 A2 * | 5/2009 | ............ B32B 21/06 |
| WO | WO 2009/080772 A1 | 7/2009 | |
| WO | WO 2009/080813 A1 | 7/2009 | |
| WO | WO 2009/116926 A1 | 9/2009 | |
| WO | WO 2009/124704 A1 | 10/2009 | |
| WO | WO 2009/135323 A1 | 11/2009 | |
| WO | WO 2010/084466 A2 | 7/2010 | |
| WO | WO 2010/087752 A1 | 8/2010 | |
| WO | WO 2010/094500 A1 | 8/2010 | |
| WO | WO 2011/087422 A1 | 7/2011 | |
| WO | WO 2011/087423 A1 | 7/2011 | |
| WO | WO 2011/129757 A1 | 10/2011 | |
| WO | WO 2011/141851 A2 | 11/2011 | |
| WO | WO 2012/004699 A2 | 1/2012 | |
| WO | WO 2012/018934 A1 | 2/2012 | |
| WO | WO 2012/031922 A1 | 3/2012 | |
| WO | WO 2012/037950 A1 | 3/2012 | |
| WO | WO 2012/141647 A1 | 10/2012 | |

OTHER PUBLICATIONS

U.S. Appl. No. 15/704,634, Darko Pervan, filed Sep. 14, 2017.
Extended European Search Report issued in EP 12771642.1, dated Oct. 7, 2014, European Patent Office, Munich, DE, 8 pages.
U.S. Appl. No. 12/270,257, Darko Pervan, Kent Lindgren, Jan Jacobsson, Niclas Håkansson, Eddy Boucké and Göran Ziegler, filed Nov. 13, 2008.
U.S. Appl. No. 13/084,974, Darko Pervan, filed Apr. 12, 2011.
U.S. Appl. No. 13/118,846, Jan Jacobsson, filed May 31, 2011.
U.S. Appl. No. 14/089,928, Darko Pervan, Kent Lindgren, Jan Jacobsson, Niclas Håkansson, Eddy Boucké Göran Ziegler, filed Nov. 26, 2013.
U.S. Appl. No. 14/237,617, Darko Pervan, filed Feb. 7, 2014.
U.S. Appl. No. 14/192,169, Darko Pervan, Kent Lindgren, Jan Jacobsson, Eddy Boucké, Göran Ziegler, Niclas Håkansson, filed Feb. 27, 2014.
U.S. Appl. No. 14/321,288, Kent Lindgren, Hans Persson and Göran Ziegler, filed Jul. 1, 2014.
U.S. Appl. No. 14/563,167, Göran Ziegler and Kent Lindgren, filed Dec. 8, 2014.
U.S. Appl. No. 14/789,339, Norbert Kalwa, filed Jul. 1, 2015.
U.S. Appl. No. 14/980,638, Darko Pervan, Jan Jacobsson, Kent Lindgren, Göran Ziegler, Niclas Håkansson and Eddy Boucké, Dec. 28, 2015.
U.S. Appl. No. 15/061,303, Darko Pervan and Göran Ziegler, filed Mar. 4, 2016.
U.S. Appl. No. 15/204,474, Georg Vetter, Jan Jacobsson, Rickard Rittinge and Hans Persson, filed Jul. 7, 2016.
U.S. Appl. No. 15/204,474, Vetter et al.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
BTLSR Toledo, Inc. website, http://www.btlresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co KgaA, Weinheim, DE.
Le Fur, X., et al., "Recycling melamine-impregnated paper waste as board adhesives," published online Oct. 26, 2004, pp. 419-423, vol. 62, Springer-Verlag, DE.
Odian, George, "Principles of Polymerization," 1991, 3$^{rd}$ Edition, 5 pages incl. pp. 122-123, John Wiley & Sons, Inc., New York, NY, USA.
"Hex Netting—Fencing—Ace Hardware," from http://www.acehardware.com/family/index.jsp?categoryId=1260278, archived on Nov. 1, 2009, accessed through the Internet Archive, WaybackMachine, 3 pages.
International Search Report issued in corresponding PCT/SE2012/050402, dated Jul. 6, 2012, 4 pages, ISA/SE Patent-och registreringsverket, Stockholm, SE.
Engstrand, Ola (Contact)/Valinge Innovation, Technical Disclosure entitled "Fibre Based Panels With a Wear Resistance Surface," Nov. 17, 2008, ip.com No. IPCOM000176590D, ip.com PriorArtDatabase, 76 page.
Engstrand, Ola (Contact)/Valinge Innovation, Technical Disclosure entitled "WFF Embossing," May 15,2009, ip.com No. IPCOM000183105D, ip.com PriorArtDatabase, 36 pages.
Engstrand, Ola (Contact)/Valinge Innovation, Technical Disclosure entitled "VA063 VA064 Scattering and Powder Backing," Nov. 11, 2011. ip.com No. IPCOM000212422D, ip.com PriorArtDatabase, 34 pages.
Vetter, Georg, et al., U.S. Appl. No. 15/204,474 entitled "Method for Producing a Building Panel,"filed in the U.S. Patent and Trademark Office, filed Jul. 7, 2016.
U.S. Appl. No. 16/416,846, Darko Pervan and Göran Ziegler, filed May 20, 2019.
U.S. Appl. No. 16/433,722, Darko Pervan, filed Jun. 6, 2019.
U.S. Appl. No. 16/439,037, Darko Pervan, Kent Lindgren, Jan Jacobsson, Eddy Boucké, Göran Ziegler and Niclas Håkansson, filed Jun. 12, 2019.
U.S. Appl. No. 16/416,846, Pervan et al.
U.S. Appl. No. 16/433,722, Pervan.
U.S. Appl. No. 16/439,037, Pervan et al.
Pervan, Darko, et al., U.S. Appl. No. 16/416,846 entitled "Powder Overlay," filed in the U.S. Patent and Trademark Office, filed May 20, 2019.
Pervan, Darko, U.S. Appl. No. 16/433,722 entitled "Panel Coating," filed in the U.S. Patent and Trademark Office, filed Jun. 6, 2019.
Pervan, Darko, et al., U.S. Appl. No. 16/439,037 entitled "Fibre Based Panels with a Wear Resistance Surface," filed in the U.S. Patent and Trademark Office, filed Jun. 12, 2019.
Mortensen. A., Editor, "Wood-Plastic Composites", *Concise Encyclopedia of Composite Materials*, 2$^{nd}$ Edition, 2007, 7 pages, including pp. 932-936, Elsevier, Ltd. , NL, retrieved from the internet: https://app.knovel.com/hotlink/pdf/id:kt00U06FO1/concise-encyclopedia/wood-plastic-composites.
U.S. Appl. No. 16/738,468, Anette Hedlund and Sofia Nilsson, filed Jan. 9, 2020.
U.S. Appl. No. 16/738,468, Hedlund et al.
Hedlund, Anette, et al., U.S. Appl. No. 16/738,468 entitled "Method of Manufacturing a Building Element and a Building Element," filed in the U.S. Patent and Trademark Office, filed Jan. 9, 2020.
U.S. Appl. No. 17/125,199, Kent Lindgren, Hans Persson and Göran Ziegler, filed Dec. 17, 2020.
U.S. Appl. No. 17/125,199, Lindgren et al.
Lindgren, Kent, et al., U.S. Appl. No. 17/125,199 entitled "Method of Manufacturing a Building Panel and a Building Panel," filed in the U.S. Patent and Trademark Office, filed Dec. 17, 2020.
Extended European Search Report issued in EP 20154879.9, filed Sep. 10, 2020, European Patent Office, Munich, DE, 9 pages.
Abdullah, E.C., et al., "Cohesiveness and Flowability Properties of Silica Gel Powder," *Physics International*, 2010, pp. 16-21, 1 (1), ISSN 1948-9803, Science Publications.

* cited by examiner

METHOD OF MANUFACTURING A LAYER

CROSS REFERENCE TO RELATED APPLICATIONS

The present application is a continuation of U.S. application Ser. No. 13/445,379, filed on Apr. 12, 2012, which claims the benefit of U.S. Provisional Application No. 61/474,485, filed on Apr. 12, 2011, U.S. Provisional Application No. 61/474,498, filed on Apr. 12, 2011, and U.S. Provisional Application No. 61/557,734, filed on Nov. 9, 2011. The entire contents of each of U.S. application Ser. No. 13/445,379, Swedish Application No. 1150321-6, Swedish Application No. 1150320-8, Swedish Application No. 1151058-3, U.S. Provisional Application No. 61/474,485, U.S. Provisional Application No. 61/474,498, and U.S. Provisional Application No. 61/557,734 are hereby incorporated herein by reference.

FIELD OF THE INVENTION

The present invention relates to a method of manufacturing a layer and a method for manufacturing a building panel. Such a layer may be used to produce a building panel, for example a floor panel, a wall panel, a ceiling panel, a furniture component or the like.

TECHNICAL BACKGROUND

Wood fibre based direct pressed laminated flooring (DPL) usually comprises a core of a 6-12 mm fibre board, a 0.2 mm thick upper decorative surface layer of laminate and a 0.1-0.2 mm thick lower balancing layer of laminate, plastic, paper or like material.

The surface layer of a laminate floor is characterized in that the decorative and wear properties are generally obtained with two separate layers one over the other. The decorative layer is generally a printed paper and the wear layer is a transparent overlay paper, which comprises small aluminium oxide particles.

The printed decorative paper and the overlay are impregnated with melamine resin and laminated to a wood fibre based core under heat and pressure. The balancing layer is used to keep the panel flat after production and when the panel is exposed to variations in moisture conditions that cause the surface layer to swell and shrink.

Recently new "paper free" Wood Fibre Floor (WFF) types have been developed with solid surfaces comprising a substantially homogenous mix of fibres, binders and wear resistant particles.

The new "paper free" WFF floors with a solid surface comprising a homogenous mix of fibres, preferably wood fibres, small hard wear resistant particles and a binder are produced according to a production method wherein the WFF mix is applied in powder form on a core. The wood fibres are generally refined, mechanically worked, and of the same type as used in HDF and particleboard, i.e. treated in a way that the lignin content is essentially unchanged. The wood fibres comprise natural resins such as lignin. The wear resistant particles are preferably aluminium oxide particles. Other suitable wear resistant materials are for example silica or silicon carbide. The surface layer comprises preferably also colour pigments and/or other decorative materials or chemicals. Processed fibres e.g. bleached wood fibres may also be used. Processed fibres may be semi-transparent, and are preferably transparent in a cured binder.

The binder is preferably a thermosetting resin such as amino resins, for example melamine or urea formaldehyde resin. Any other binder, preferably synthetic thermosetting or thermoplastic resins, may be used.

The WFF layer is generally scattered in dry powder form on a wood based core, such as for example HDF. The layer is cured under heat and pressure to a 0.1-1.0 mm solid layer.

Several advantages over known technology and especially over conventional laminate floorings can be obtained:

The wear resistant surface layer, which is a homogenous mix, can be made much thicker compared to conventional laminate surface layers and a wear resistance is achieved, which is considerably higher.

New and very advanced decorative effects can be obtained with deep embossing and by separate decorative materials, which can be incorporated into the homogenous surface layer and coordinated with the embossing.

An increased impact resistance can be reached with a homogenous surface layer, which is thicker and has a higher density.

The homogenous surface layer can comprise particles that have a positive impact on sound and moisture properties.

Production costs can be reduced since low cost and even recycled materials can be used and several production steps can be eliminated.

In WO 2009/065769, a separate wood fibre layer of the above described WFF type is disclosed, which may be used as a separate surface layer. The layer is cured by applying heat and pressure such that a separate layer is formed. However, handling of this type of separate layer has proven to be difficult, since the cured layer becomes brittle and difficult to handle without being damaged.

SUMMARY OF THE INVENTION

It is an object of the present invention to provide an improvement over the above described techniques and prior art.

A further object of certain embodiments is to provide a method for manufacturing a layer, which can be handled as a separate semi-finished product before being attached to a core.

A further object of certain embodiments is to provide a method for manufacturing a layer, which is less brittle compared to prior art products.

At least some of these and other objects and advantages that will be apparent from the description have been achieved by a method of manufacturing a separate and continuous layer being essentially uncured according to a first aspect of the invention. The method comprises applying a powder mix comprising fibres and a thermosetting binder on a carrier, forming a powder mix layer, wherein the powder mix is connected together such that the powder mix layer is obtained and wherein the powder mix layer is essentially uncured, and releasing the powder mix layer from the carrier.

An advantage of the present invention is that a layer is obtained which can be handled as a separate product. The layer thus forms a semi-finished product. The semi-finished product is sufficiently bound together such that a continuous layer is formed. Thereby, the layer can be handled as a separate sheet.

Since the layer is essentially uncured, the layer obtained by the method is less brittle compared to a thin layer of a corresponding cured material. The layer may for example be bent without cracking. Thereby, the layer can be handled and stored with reduced risk for damaging the product.

In a subsequent process, the layer may be attached to a core to form for instance a surface layer of a building panel. However, the layer may be stored and transported separately from the core. The powder mix layer may be cured, for example by applying heat and pressure, when being attached to the core.

A further advantage is that the layer can be attached to a core simultaneously as curing the layer. No additional binder between the layer and the core has to be added. When curing the layer, the binder in the layer also connects the layer to the core.

The layer may for instance be used as a protective layer for example a surface layer, a printing layer, a decorative layer, a wear layer, a balancing layer, an antistatic layer, an antibacterial layer etc.

The powder mix layer may be flexible. Since the powder mix layer is essentially uncured, it is flexible such that it may be bent without cracking. Consequently, the layer may be attached to a surface not being planar but curved. The layer may thus adapt to a curved surface. This property of the layer may be especially useful in furniture applications and in flooring applications for instance for creating a bevel in a floor panel etc. The flexibility of the layer also facilitates handling and storage of the layer without damaging the product.

The step of forming the powder mix layer may include applying moisture on the powder mix such that the powder mix is connected together. The liquid of the moisture swells or at least partly dissolves the binder, thereby making the binder tacky and sticky. The binder thereby binds the fibres particles in the powder mix to each other such that a continuous material is formed.

The moisture may be finely diffused or may include applying droplets of a liquid.

A liquid forming the moisture may be water, an alcohol, ink, a binder, preferably a thermosetting binder, more preferably melamine formaldehyde, or a mixture thereof. The liquid may be a solution or dispersion. By applying a coloured liquid, the layer may be coloured. The liquid may include pigments. The liquid may further include additive or substances with technical and chemical properties such as photocatalytic particles, agents such as release agents or other materials. The liquid may further include wear resistant particles, for example silica, aluminium oxide or other abrasive particles.

The liquid forming the moisture may be applied in form of aerosols, steam, vapour, spray, free mist, dispersion etc.

The step of forming the powder mix layer may include drying and/or heating the powder mix such that the powder mix is connected together. By heating, and thereby drying the powder mix, moisture leaves the powder mix thus leaving the fibres in the mix adhered to each other. Heat is applied in such manner that the binder remains essentially uncured. The binder becomes sticky and thereby binds the fibres in the powder mix to each other. By using a combination binder, such as Acrodur® 950L from BASF, including both thermosetting and thermoplastic properties, parts of the binder having thermoplastic properties melt when heating the powder mix, thereby binding the fibres in the powder mix to each other. By heating the binder to a temperature below the curing temperature, i.e. a temperature where major part of the curing takes place, parts of the binder having thermosetting properties remain essentially uncured.

The powder mix may be heated to a temperature below the curing temperature. By curing temperature is meant a temperature where major part of the curing of the binder takes place. Thereby, the binder remains essentially uncured.

The step of forming the powder mix layer may include applying pressure on the powder mix such that the powder mix is connected together. The pressure compresses the powder mix such that the fibres in the powder mix bind to each other mechanically. By applying the pressure without heating, the layer remains essentially uncured.

The fibres may be wood fibres, plastic fibres, mineral fibres or vegetable fibres such as example jute, linen, flax, cotton, hemp, bamboo, bagasse and sisal, or a mixture thereof.

The thermosetting binder may be a melamine resin. Also other types of binders are contemplated, such as thermoplastic binders, or a combination binder including both thermoplastic and thermosetting properties, such as Acrodur® 950L from BASF. The binder may be one of several binders in a binder mix.

The step of applying the powder mix on the carrier may comprise applying the powder mix on a supporting layer arranged on the carrier. The supporting structure may also act as a reinforcement.

The method may further comprise arranging a reinforcement structure in the powder mix. The reinforcement structure reinforces the powder mix such that a more rigid layer is obtained.

The supporting layer and/or the reinforcement structure may comprise a non-woven sheet, a paper sheet, mineral fibres, carbon fibres, textile fibres or nylon fibres. An example of a paper sheet is an impregnated overlay.

The method may further comprise printing a print in the powder mix and/or in the powder mix layer, preferably by means of digital printing. Printing may take place both before and after the powder mix layer has been formed.

The method may further comprise printing a print on both sides of the uncured layer. The same print may be printed on both side of the uncured layer. Alternatively, a first print may be printed on a first side of the layer, and a second print may be printed on a second side of the layer. The first and second prints may be offset horizontally in order to create a visual impression of depth.

The method may further comprise applying moisture in a pattern, preferably by means of digital printing. By applying moisture in a pattern, a specific design of the layer may be obtained. Only the portions of the powder mix to which moisture is applied to will form a continuous layer. The rest of the powder mix will not connect together but will remain in powder form. The continuous layer can therefore be removed from the rest of the powder mix. The powder mix not forming the continuous layer can be collected and be reused.

By applying moisture in a pattern, it is possible to form a powder mix layer having different properties in different directions. The powder mix layer may then be designed to have similar properties as a layer such as paper or wood having a major fibre direction.

The method may further comprise tearing the powder mix layer into smaller portions forming decorative elements. Such decorative elements, or decorative flakes may add a specific feature, function or design to a layer. The decorative elements may be applied to a surface layer, preferably a wood fibre based surface layer, which is applied to a core to form a surface layer of a building panel. Alternatively, the decorative elements can be mixed with a powder mix, preferably a wood fibre powder mix, which is applied to a core to form a surface layer of a building panel. Furthermore, a plurality of decorative elements may together form a surface layer.

The method may further comprise curing the power mix layer. The layer may be cured before being applied to a core. Especially if being provided with a reinforcement, the layer is still flexible. Even if already being cured, the layer can be attached to a core by applying heat and pressure on the cured layer without impairing the appearance of the layer.

The powder mix layer may be a protective layer. By protective layer is meant any kind of layer such as surface layer, a printing layer, a decorative layer, a wear layer, a balancing layer etc.

According to a second aspect of the invention, a method of manufacturing a continuous layer being essentially uncured is provided. The method comprises
 applying moisture to a web,
 applying a powder mix comprising fibres and a thermosetting binder on the web,
 forming a powder mix layer by heating the powder mix, whereby the powder mix is connected together such that the powder mix layer is obtained and wherein the powder mix layer is essentially uncured.

The method according to the second aspect of the invention provides an alternative method of manufacturing a continuous, essentially uncured layer. The layer forms a semi-finished product, which can be attached to a core in a subsequent process as described below.

The method according to the second aspect of the invention incorporates the advantages, which have been described above with reference to the first aspect of the invention, whereby the previous discussion is applicable also for the method according to the second aspect of the invention.

The method may further comprise cutting the web having the powder mix applied thereon into separate sheets.

The web may be formed of a flexible sheet, preferably a non-woven sheet.

The step of applying the powder mix may comprise applying the powder mix on both sides of the web. By applying the mix on the web extending in a vertical direction, the powder may be applied to the web on both sides simultaneously.

The fibres may be wood fibres, plastic fibres, mineral fibres or vegetable fibres such as jute, linen, flax, cotton, hemp, bamboo, bagasse and sisal, or a mixture thereof.

According to a third aspect of the invention, a method for manufacturing a building panel is provided. The method comprises
 providing a power mix layer manufactured according the first or second aspect of the invention,
 arranging the powder mix layer on a core, and
 attaching the powder mix layer to the core by applying heat and pressure.

An advantage of the third aspect of the invention is that the layer may be attached to the core and cured in a single step. When curing the layer by applying heat and pressure, the binder in the layer also binds the layer to the core. No additional binder is required.

If the layer already has been cured in a preceding step, a layer of a powder mix may be arranged between the layer and the core, and heat and pressure may be applied to the layer. Alternatively, the powder mix layer may be attached to the core by means of a binder or adhesive of any other type.

The powder mix may comprise wood fibres and a binder, preferably a thermosetting binder.

The building panel may for example be a floor panel, a wall panel, a ceiling panel, a furniture component or the like. The layer may for instance form a surface layer, a printing layer, a decorative layer, a wear layer, a backing layer, a balancing layer or a protective layer when attached to the core.

According to a fourth aspect of the invention, a separate and continuous layer is provided. The layer is preferably produced according to the first or second aspect of the invention.

The layer comprises a powder mix layer comprising a powder mix including fibres and a thermosetting binder, wherein the powder mix is connected together to form the powder mix layer, and wherein the powder mix is essentially uncured. The fibres may be wood fibres.

The layer according to the fourth aspect of the invention incorporates the advantages, which have been described above with reference to the first aspect of the invention, whereby the previous discussion is applicable also for the layer.

BRIEF DESCRIPTION OF THE DRAWINGS

The present invention will by way of example be described in more detail with reference to the appended schematic drawings, which show an embodiment of the present invention.

DETAILED DESCRIPTION

Figure 1A:
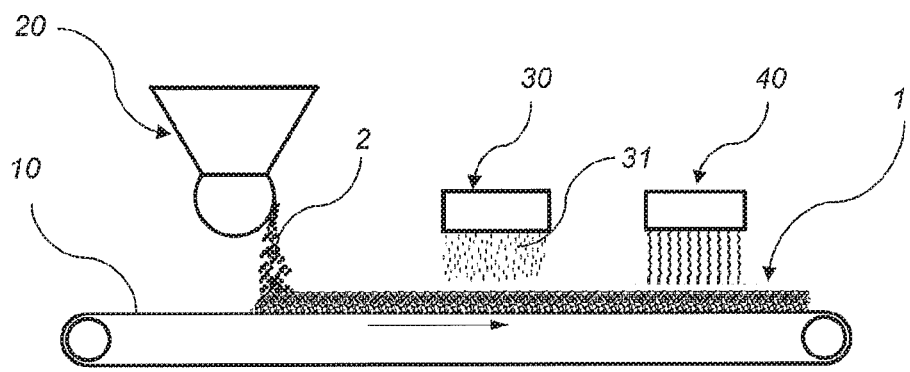
FIGS. 1*a-d* schematically illustrate a method of manufacturing a layer.

A method of manufacturing a layer 1 will now be described with reference to FIG. 1*a*. FIG. 1*a* shows a production line comprising an applying unit 20, preferably a scattering unit, for applying a powder mix 2 on a carrier 10. The production line further comprises a stabilization unit 30 for applying moisture 31 and a heating unit 40 for heating and/or drying the powder mix 2.

As a first step, a powder mix 2 is applied on the carrier 20. In the shown embodiment, the conveyor belt forms the carrier 20. The powder mix 2 comprises fibres 4 and a thermosetting binder 3. The fibres 4 are preferably wood fibres, but may also be plastic fibres, mineral fibres or vegetable fibres such as for example jute, linen, flax, cotton, hemp, bamboo, bagasse and sisal. If wood fibres are used, the wood fibres may be raw, recycled, virgin, processed or waste wood. By processed wood particles is meant wood particles that have been mechanically and/or chemically treated. By processed wood particles is further meant wood particles that have been bleached, sieved and/or milled. An example of such processed wood particles is Jelucel® HM 150 produced by Jelu-Werk. The wood particles may have a size of less than 300 µm, preferably less than 100 µm.

As described above, the wood particles or fibres may be refined or unrefined. Depending on the application, the lignin content of the wood particles may vary. Both wood particles having low lignin content and wood particles having high lignin content may be used, depending on the application of the layer to be formed. In certain embodiments, α-cellulose particles are used.

The powder mix 2 may also comprise additives, agents, pigments etc. The powder mix may also include wear resistant particles such as aluminium oxide and silica.

The thermosetting binder is preferably an amino resin such as melamine formaldehyde (MF).

The powder mix 2 is applied on the carrier 10 as a thin layer, preferably having a uniform thickness. However, the particles in the powder mix are not bound to each other but are still in powder form.

In a subsequent step, moisture 31 is applied to the powder mix 2. The moisture 31 may be finely dispersed or may include droplets of a liquid. The powder mix may also attract humidity from the air, thereby applying moisture to the powder mix. The liquid forming the moisture may be water, an alcohol, ink, a binder, preferably a thermosetting binder, more preferably melamine formaldehyde, or a mixture thereof. The liquid may further include substances such as additives, agents, pigments or pre-treatments, for example controlling a subsequent printing process.

When moisture 31 is applied to the powder mix 2, the moisture swells or at least partly dissolves the binder 3. Thereby, the binder 3 in the powder mix becomes tacky and sticky. Consequently, the binder 3 starts to bind the fibres 4 in the powder mix to each other to form a powder mix layer 1.

By applying heat to the powder mix such that the powder mix is dried, the moisture 31 is at least partly removed from the powder mix 2, thereby the binder 3 being tacky further binds the fibres 4 in the powder mix to each other such that a powder mix layer 1 is formed. The powder mix layer 1 can be handled as a separate layer or sheet and does not longer behave as a powder. However, the binder 3 in the powder mix 2 remains essentially uncured.

Heat may be applied to the powder mix by means of for instance IR heating 40, a heated roller making contact with the powder mix or the carrier being heated.

In some circumstances, it may be sufficient to apply only heat to form a powder mix layer.

In a subsequent step, the powder mix layer 1 is released from the carrier 10. The powder mix layer 1 now forms a separate and continuous layer or sheet, which forms a semi-finished product.

As an alternative to apply moisture 31 and heat to the powder mix 2, the powder mix 2 may include a combination binder, i.e. a binder having both thermosetting and thermoplastic properties.

Figure 1B:
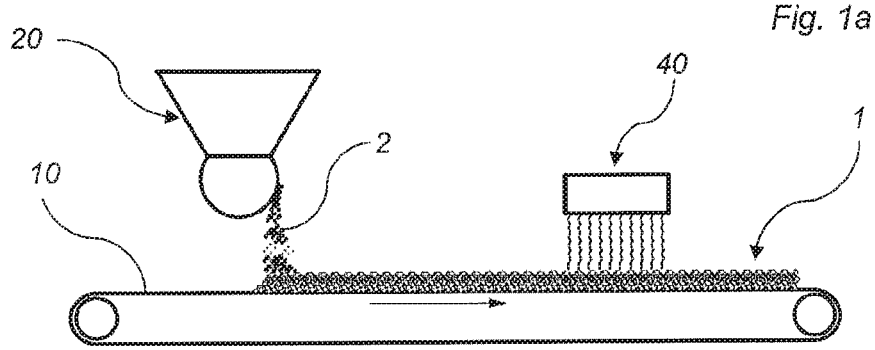

In this case, the powder mix 2 is heated, which is shown in fig. 1b to which reference now is made. The fibres 4 in the powder mix 2 are of the same type as described above. In this embodiment, the thermosetting binder is included in a combination binder such as Acrodur® 950L from BASF, having both thermoplastic and thermosetting properties. The binder is included in the powder mix 2.

The powder mix 2 is applied to the carrier 10 in a similar way as described above with reference to FIG. 1a.

After being applied to the carrier 10, the powder mix 2 is heated, for instance by means of IR heating 40, or by a heated roller making contact with the powder mix or the carrier being heated. The heating melts parts of the binder having thermoplastic properties such that the binder becomes tacky and sticky. When the binder becomes tacky, the binder binds the fibres in the powder mix to each other such that a powder mix layer 1 is formed. However, parts of the binder having thermosetting properties remain essentially uncured.

In a subsequent step, the powder mix layer 1 is released from the carrier 10. The powder mix layer 1 now forms a separate and continuous layer or sheet, which forms a layer.

Figure 1C:
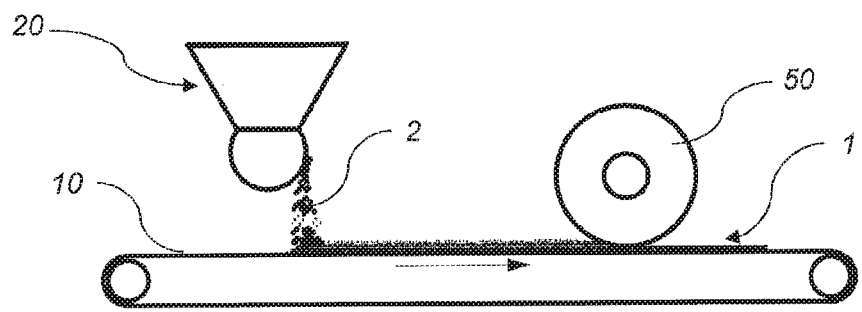
Figure 1D:
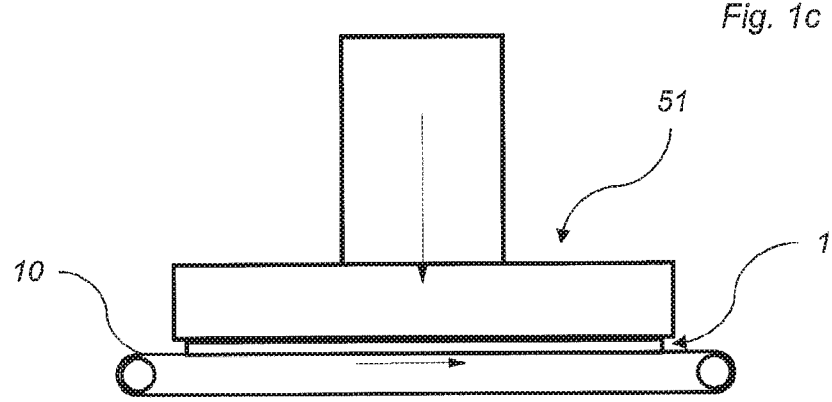

As a further alternative, pressure may be applied to the powder mix 2, which is shown in FIGS. 1c-d. The powder mix 2 is of the same type as described above with reference to FIG. 1a. The powder mix 2 is applied to the carrier 10 in a similar way as described above with reference to FIG. 1a.

After being applied to the carrier 10, pressure is applied to the powder mix 2, which is shown in FIGS. 1c-d. The pressure mechanically connects the fibres 4 of the powder mix 2 to each other such that a continuous powder mix layer 1 is formed. The pressure applied is chosen such that the binder 3 in the powder mix 2 remains essentially uncured. In FIG. 1c, pressure is applied to the powder mix by means of a roller 50. In FIG. 1d, pressure is applied by means of a press plate 51.

Preferably, moisture 31 is applied to the powder mix 2 before applying the pressure. The liquid forming the moisture 31 swells or at least partly dissolves the binder, thereby making the binder tacky. The binder 3 thereby starts to bind the fibres 4 in the powder mix to each other. By applying pressure, the binder 3 further binds 4 the fibres to each other, thereby forming a powder mix layer 1. By applying both heat and pressure, for example by a heated roller or heated press plate, binding of the fibres 4 by means of the binder 3 being tacky is further improved. However, the binder 3 remains essentially uncured.

In a subsequent step, the powder mix layer 1 is released from the carrier 10. The powder mix layer 1 now forms a separate and continuous layer or sheet, which forms a layer.

In all embodiments, the carrier 10 may be provided with a release foil or the like in order to facilitate releasing the powder mix layer 1 from the carrier 10. The carrier 10 may be formed of the conveyor belt, or as a separate carrier arranged on the conveyor belt.

Figure 2:
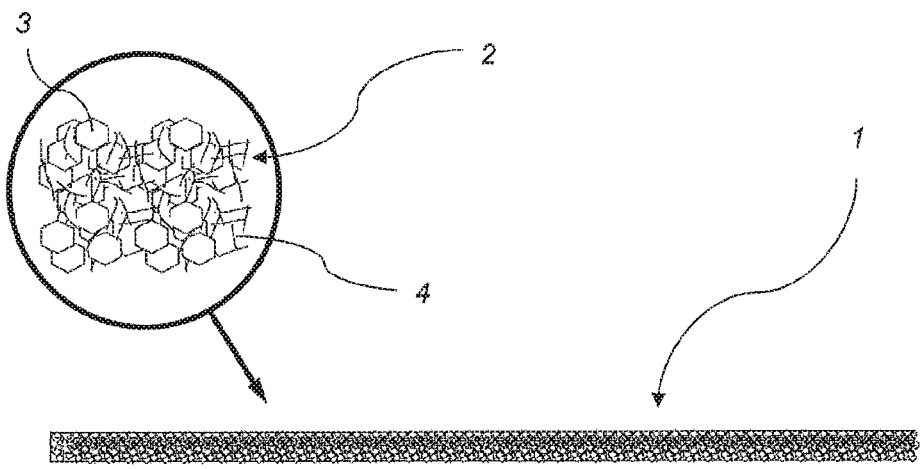
FIG. 2 illustrates a layer.

Common for the above described methods is that a layer or sheet 1 is obtained, which may be handled and stored separately from the carrier 10. Such a layer is shown in FIG. 2. The layer 1 comprises fibres 4 and a thermosetting binder 3. The fibres 4 may be of the above described type. In the layer 1, the fibres 4 are connected in any of the above described ways such that a separate and continuous layer or sheet 1 is formed. The layer 1 is essentially uncured. The binder 3 in the powder mix 2 forming the layer 1 remains essentially uncured in the layer.

The layer 1 may be used as a protective layer, a surface layer, a printing layer, a decorative layer, a wear layer, a backing layer etc.

Figure 3A:
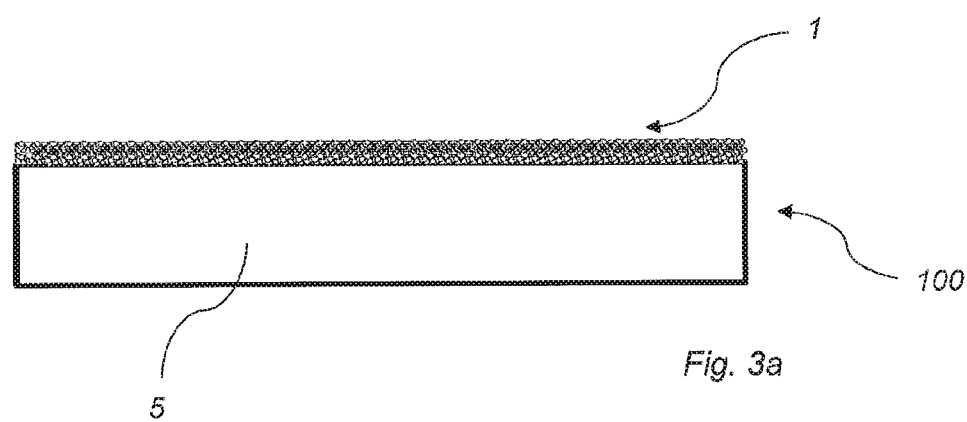
FIG. 3*a* illustrates a building panel wherein a layer forms a surface layer.

FIG. 3a shows an embodiment wherein the layer 1 forms a surface or protective layer of a building panel 100. The building panel 100 may be a floor panel, a wall panel, a ceiling panel, a furniture component or the like.

In FIG. 3a, the layer 1 is arranged on a core 5. The core 5 may be a wood-based core such as MDF, HDF, OSB, WPC or particleboard. Alternatively, the core 5 may be a thermoplastic core. The layer 1 is adhered to the core 5 simultaneously as being cured. By applying heat and pressure to the layer 1, the binder 3 in the powder mix 2 layer cures. The binder 3 in the powder mix layer 1 also binds the powder mix layer 1 to the core 5 during curing. Thereby, no additional binder is required to attach the layer 1 to the core 5.

In an embodiment, the powder mix layer 1 is cured in a preceding step before being applied to a core 5. If the layer 1 has been cured in a preceding step, a layer of a powder mix may be arranged between the powder mix layer 1 and the core 5. Heat and pressure is then applied to the powder mix layer 1 in order to connect the powder mix layer 1 forming the surface layer to the core 5. The powder mix applied between the powder mix layer 1 and the core 5 preferably comprises fibres 4, preferably wood fibres, and a binder 3, preferably a thermosetting binder.

Even if the powder mix layer 1 already has been cured, heat and pressure applied in a second operation to bind the layer 1 to the core 5 do not damage the surface of the layer 1.

Alternatively, another type of binder or adhesive may be applied between the powder mix layer 1 and the core 5. For example, a UV binder may be used.

Alternatively, a first part of the powder mix layer may be cured before being applied to the core and a second part of the powder mix layer may be cured when being applied to the core.

In another embodiment, the uncured powder mix layer 1 is adhered to a core 5 by means of a binder before being cured. For example, a UV binder may be used to adhere the powder mix layer 1 to the core. After being adhered to the core 5, the powder mix layer 1 is cured, for example by applying heat and pressure.

Figure 3B:
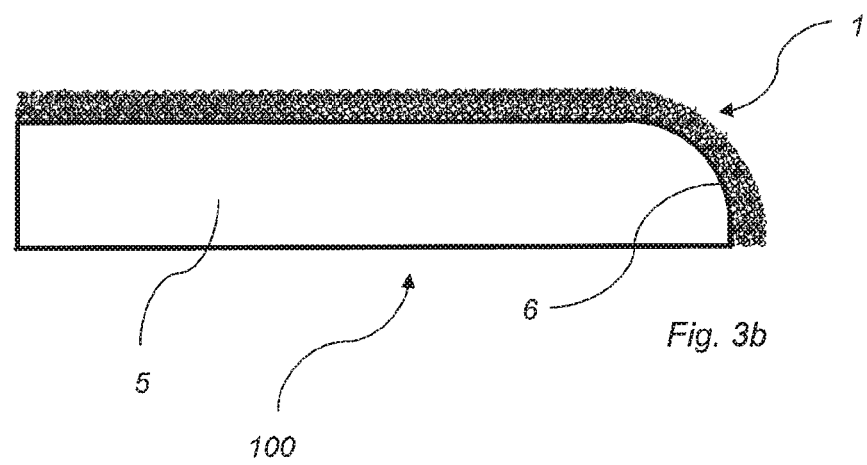
FIG. 3*b* illustrates a building panel wherein a layer forms a curved surface layer.

FIG. 3b shows a building panel 100 having a curved surface 6 wherein the powder mix layer 1 forms a surface layer or protective layer. The curved surface 6 may as an example be an edge of a furniture component such as a table or worktop. Due to the flexible and bendable properties of the powder mix layer 1, the layer 1 can be attached to a curved surface 6. Due to its flexible properties, the layer 1 adapts to the curved surface 6. The layer 1 thereby may form a curved surface layer. The core 5 may be a wood-based core such as MDF, HDF, OSB, WPC or particleboard.

As described above with reference to FIG. 3a, the powder mix layer 1 is adhered to the core 5 simultaneously as being cured. The layer 1 is arranged on the curved surface 6. The powder mix layer 1 adapts to the curvature of the surface 6. By applying heat and pressure to the layer 1, the binder 3 in the powder mix layer 1 cures. Preferably, the shape of the press plate is complementary to the shape of the curved surface 6 on which the layer 1 is to be adhered. Pressure may also be applied by means of a roller. The binder 3 in the powder mix layer 1 also binds the powder mix layer 1 to the core 5 during curing. Thereby, no additional binder/adhesive is required to attach the layer to the core 5. When being cured, the layer 1 forms a surface or protective layer following the shape of the curved surface 6. Alternatively, the powder mix layer 1 may be adhered to the curved surface 6 by means of an adhesive.

Thereby, a building panel 100 is provided, comprising a core 5 having a curved surface 6 and a powder mix layer 1, wherein the powder mix layer 1 is attached to the curved surface 6.

The powder mix layer 1 may in some embodiments form a wear layer. The wear layer may for example be arranged on top of a decorative surface arranged on the core. The layer 1 may comprise wear resistant particles such as aluminium oxide. Especially a top portion of the layer 1 may be provided with wear resistant particles. Alternatively, the layer 1 has both decorative and wear resistant properties.

In the above described examples, a single layer of the powder mix layer 1 forms the surface or protective layer. However, it is contemplated that more than one layer 1 may be arranged on a core for forming a surface layer. For instance, it is contemplated that more than one layer 1 formed from different layers, wherein the layers have different properties due to different additives, colour etc., may be arranged on a core to form a surface layer.

Figure 4:
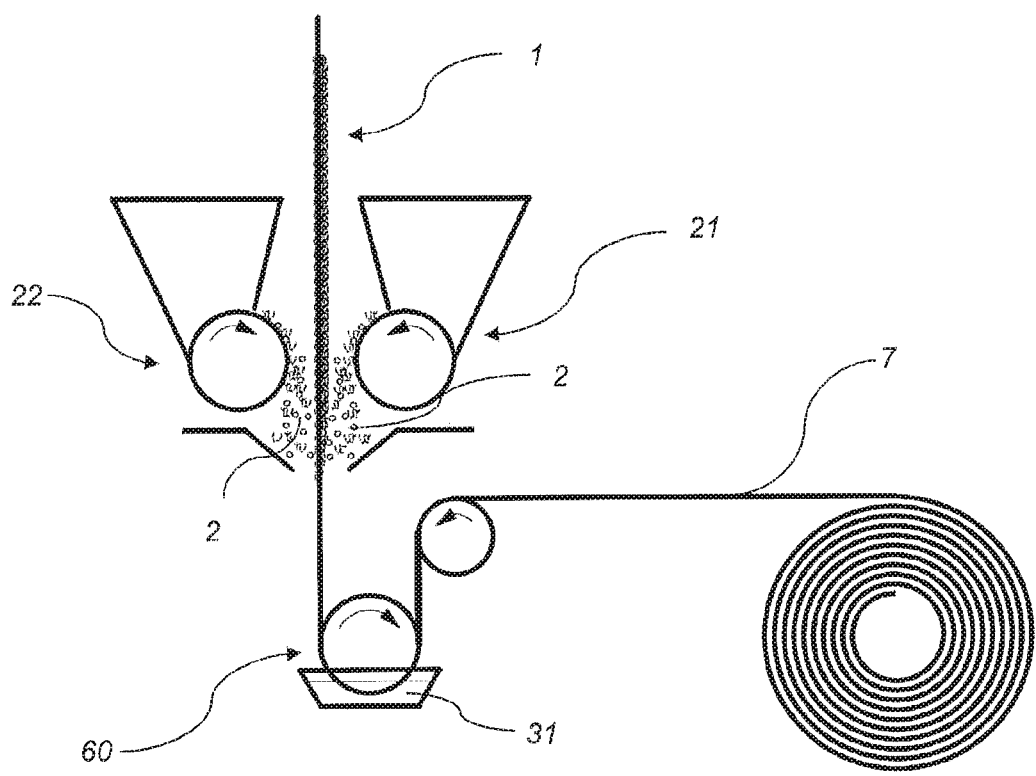
FIG. 4 illustrates an alternative method of manufacturing a layer including a reinforcement structure.

A method of manufacturing a powder mix layer 1 including a web 7 will now be described with reference to FIG. 4. FIG. 4 shows a production line including an applying unit, preferably comprising two scattering units 21, 22. The applying unit is adapted to apply a powder mix 2 on a web 7.

The web 7 will act as a reinforcement structure in the powder mix layer 1. For instance, the web 7 may increase the tear resistance of the layer. The web 7 may be a netting or wire structure or a sheet. The sheet may be a non-woven sheet, a paper sheet, a rice paper, or a sugar paper. The web 7 may comprise carbon fibres, mineral fibres such as glass wool, or plastic fibres such as nylon fibres. The web 7 may both be of a type that remains in the powder mix layer after curing or of a typing melting during curing of the powder mix layer 1.

The powder mix 2 is of the type described above with reference to FIG. 1a.

Moisture 31 is first applied to the web 7. Moisture 31 may for example be applied by guiding the web 7 into a container 60 filled with a liquid as shown in FIG. 4. The liquid forming the moisture is of any type described above. The applying unit 21, 22 preferably applies the powder mix 2 to both sides of the web 7. The powder mix 2 is applied to the web 7 when the web 7 is extending in a vertical direction. A suction fan may be provided in order to collect powder mix not adhering to the web 7. Alternatively, a container collecting unattached powder mix may be arranged below the applying units.

The moisture 31 gets the powder mix 2 to adhere to the web 7. Furthermore, the moisture 31 swells or at least partly dissolves the binder 3 in the powder mix 2 such that the binder 3 becomes tacky and starts to bind the fibres 4 to each other. The connection between the fibres 4 may further be improved by applying heat to the web 7 having the powder mix 2 applied thereon. A web of a powder mix layer 1 may thereby be formed. By cutting the web into separate sheets, a separate and continuous layer or sheet is formed which constitutes the powder mix layer 1.

As an alternative to apply the powder mix 2 on both sides of a reinforcement structure simultaneously, a process similar to the process described with reference to FIG. 1a may be used. A powder mix 2 of the above described type is applied on a carrier 10 as described above. A reinforcement structure is arranged on the powder mix 2. The reinforcement structure may increase the tear resistance of the powder mix layer 1. The reinforcement structure may be a netting or wire structure or a sheet. The sheet may be a non-woven sheet, a paper sheet, a rice paper, or a sugar paper. The reinforcement structure may comprise carbon fibres, mineral fibres such as glass wool, or plastic fibres such as nylon fibres. The reinforcement may both be of a type that remains in the powder mix layer after curing or of a typing melting during curing of the powder mix layer.

Additional powder mix 2 may then applied on the reinforcement structure. A separate and continuous sheet or layer 1 is formed by applying moisture 31, heat and/or pressure as described above.

Figure 5:
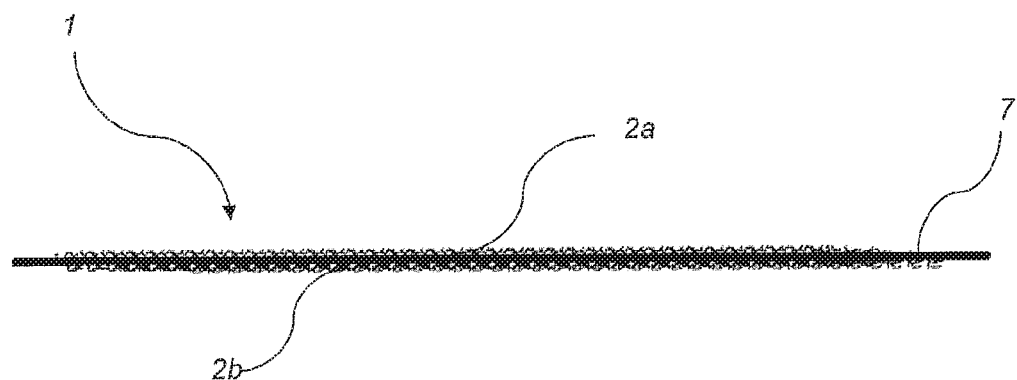
FIG. 5 illustrates a layer manufactured according the method shown in FIG. 4.

FIG. 5 illustrates a powder mix layer 1 having powder mix 2 arranged on both sides on a web or reinforcement structure manufactured according the methods described above. The powder mix layer 1 comprises a first powder mix layer 2a, a second powder mix layer 2b and the web or reinforcement structure 7 arranged there between. The layer 1 including the web or reinforcement structure 7 may be used as a protective layer, surface layer, a printing layer, a decorative layer, a wear layer, a backing layer etc. on a building panel as previously described.

Figure 6:
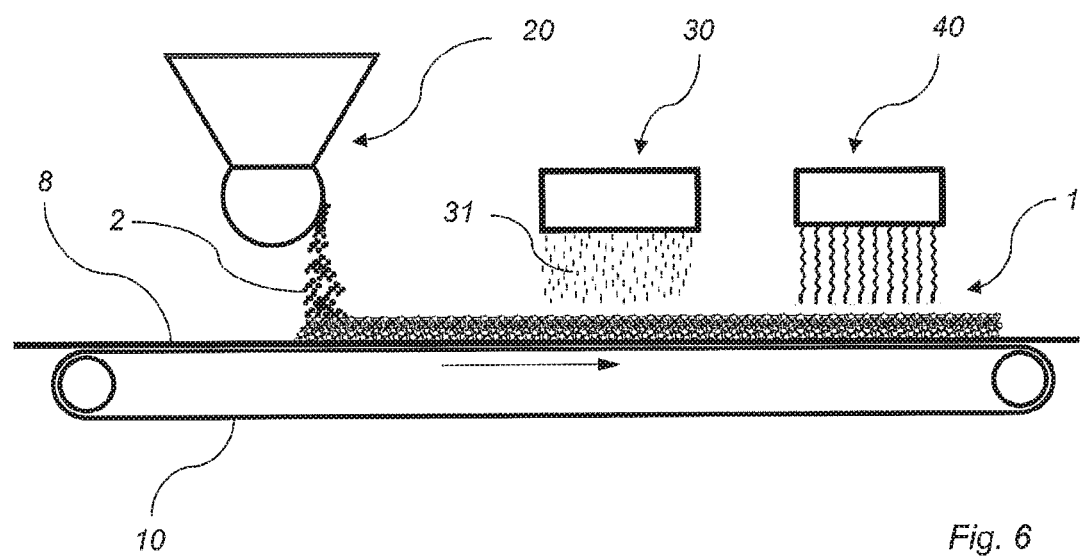
FIG. 6 illustrates an alternative method of manufacturing a layer including a supporting layer.

FIG. 6 illustrates an alternative method of manufacturing a powder mix layer 1 including a supporting layer 8. A production line includes an applying unit 20 for applying the powder mix 2 of the above described type and a carrier 10. A supporting layer 8 is arranged on the carrier 10. The powder mix 2 is applied to the supporting layer 8. The powder mix 2 is connected to the supporting layer 8 such that a separate and continuous layer 1 is formed by applying moisture 31, heat and/or pressure as previously described.

The supporting layer 8 may be a non-woven, a paper, a rice paper, or a sugar paper.

Although named a supporting layer 8, the supporting layer 8 may also function as a reinforcement structure.

Figure 7:
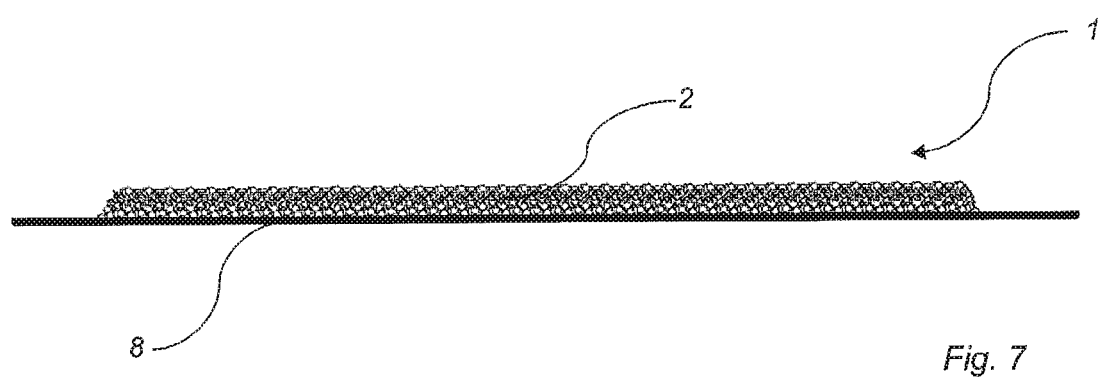
FIG. 7 illustrates a layer manufactured according the method shown in FIG. 6.

A powder mix layer 1 manufactured according to the embodiment described in FIG. 6 thus comprises the supporting layer 8 and the powder mix layer 1 arranged on the supporting layer 8 as shown in FIG. 7. The layer 1 may be arranged on a core 5 as described above for forming part of a building panel 100.

Common for all embodiments is that the powder mix layer 1 may include decorative properties such that a decorative surface layer can be formed. The decorative properties may be obtained by adding additives, pigments or similar to the powder mix. The layer may also be coloured by applying moisture including a coloured substance.

Figure 8:
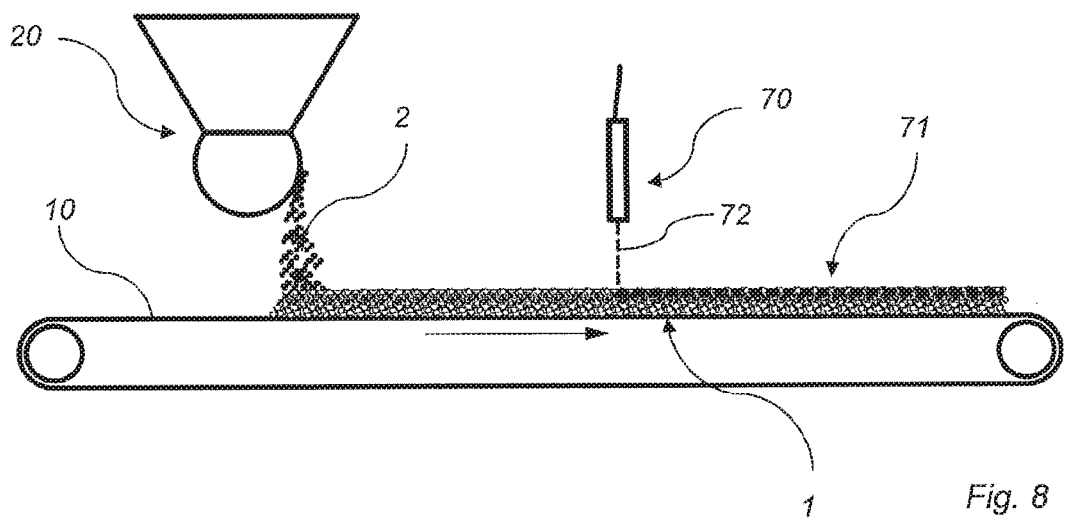
FIG. 8 illustrates a method for printing a print in the layer.

Decorative properties may also be obtained by printing a print 71 in the powder mix layer 1. FIG. 8 illustrates a method for printing a print in the layer. As described above, a powder mix 2 of the above defined type is applied on a carrier 10 by means of an applying unit 20. A print 71 is printed in the powder mix by means of a printing device 70. The print 71 is preferably printed by means of digital printing. The ink 72 may be a water based ink or a UV curable ink.

Moisture 31 is then applied to the powder mix in the above described way such that a powder mix layer 1 including the print 71 is formed. Preferably, heat and/or pressure is also applied also described above.

Printing may take place both before, as described above, and after the powder mix layer 1 has been formed. In the latter case, a print 71 is printed into the powder mix layer 1 after moisture and/or heat and pressure has been applied.

If the print is printed in the powder mix 2 before being formed to a layer 1, printing with ink 72 may correspond to the step of applying moisture to the powder mix.

Thereby, no additional moisture has to be applied. The ink 72 swells or at least partly dissolves the binder 3. Thereby, the binder 3 becomes tacky and binds the fibres 4 in the powder mix 2 to each other to form a powder mix layer 1. In subsequent steps, heat and/or pressure may be applied in order to further bind the fibres 4 to each other. However, heat and pressure is applied in a way such that the binder remains essentially uncured.

The print 71 is printed on one side of the powder mix layer 1 in the embodiment shown in FIG. 8. A print 71 may also be printed on both sides of the layer 1. The same print may be printed on both sides. Alternatively, a first print may be printed on a first side of the layer and a second print may be printed on a second side of the layer. The first and second print may be offset relative each other. By printing on both sides of the layer, an impression of depth can be created.

Figure 9:
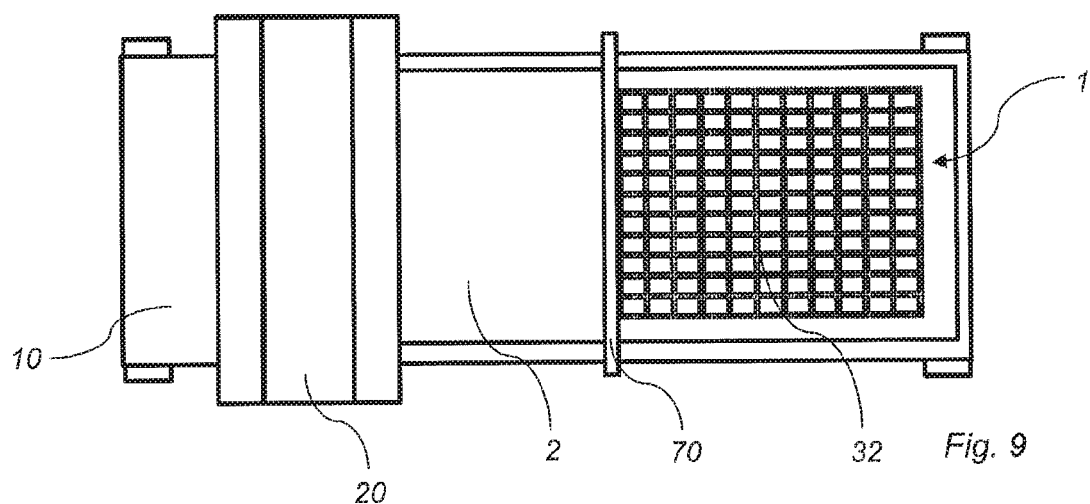
FIG. 9 illustrates a method for applying moisture in a pattern.

FIG. 9 illustrates a method for applying moisture 31 in a pattern 32. FIG. 9 shows the carrier 10, the applying unit 20, the printing device 70 and the powder mix layer 1 as seen from above. The powder mix 2 is applied to a carrier 10. The powder mix 2 is of the above described type. Moisture 31 is then applied to the powder mix 2 to a predetermined portion of the powder mix 2. Thereby, a predetermined shape of the powder mix layer 1 can be obtained. Since moisture 31 only is applied to a portion of the powder mix 2, the binder 3 only binds the fibres 4 in the powder mix 2 in that specific portion. The rest of the powder mix 2 where no moisture 31 is applied remains unbound and remains in powder form. The portion where the moisture 31 binds the fibres 4 in the powder mix 2 to each other can be separated from the rest of the powder mix 2. The portion where the moisture 31 binds the fibres 4 in the powder mix 2 to each other, due to the binder 3 being tacky by the applied moisture 31, forms the powder mix layer 1.

Figure 10:
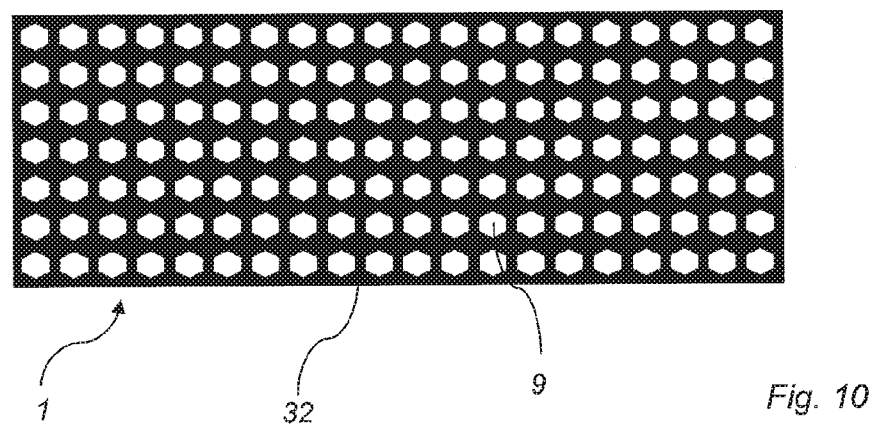
FIG. 10 illustrates a semi-finished manufactured according to the method shown in FIG. 8.

By applying moisture 31 to the powder mix 2 by means of a digital printing device, well-defined patterns 32 or shapes can be provided, which is shown in FIG. 10. The digital printing device 70 only applies moisture to a predetermined area of the powder mix 2. The area where moisture has been applied can form a pattern 32. In the area where moisture 31 has been applied, the binder 3 becomes tacky and sticky and binds the fibres 4 in the powder mix 2 to each other such that a powder mix layer 1 is formed. Preferably, heat and/or pressure is also applied. The powder mix layer 1 can be separated from the powder mix 2 to which no moisture has been applied. Even if the powder mix layer forming the powder mix layer 1 is not uniform in thickness but is provided with holes 9, it forms a continuous structure. The layer may for example be shaped as a netting.

The pattern 32 can be designed to suit a certain object, for example as a balancing layer adapted to behave as the surface layer, compensating for a surface layer having different properties in different directions.

Instead of applying moisture to a predetermined area or portion, pressure or heating may equally be applied to the predetermined area or portion of the powder mix.

In an embodiment of the invention the powder mix layer 1 does not have a uniform thickness. The layer may for example be provided with recesses. The powder mix material combined with the recesses may form a pattern.

Figure 11:
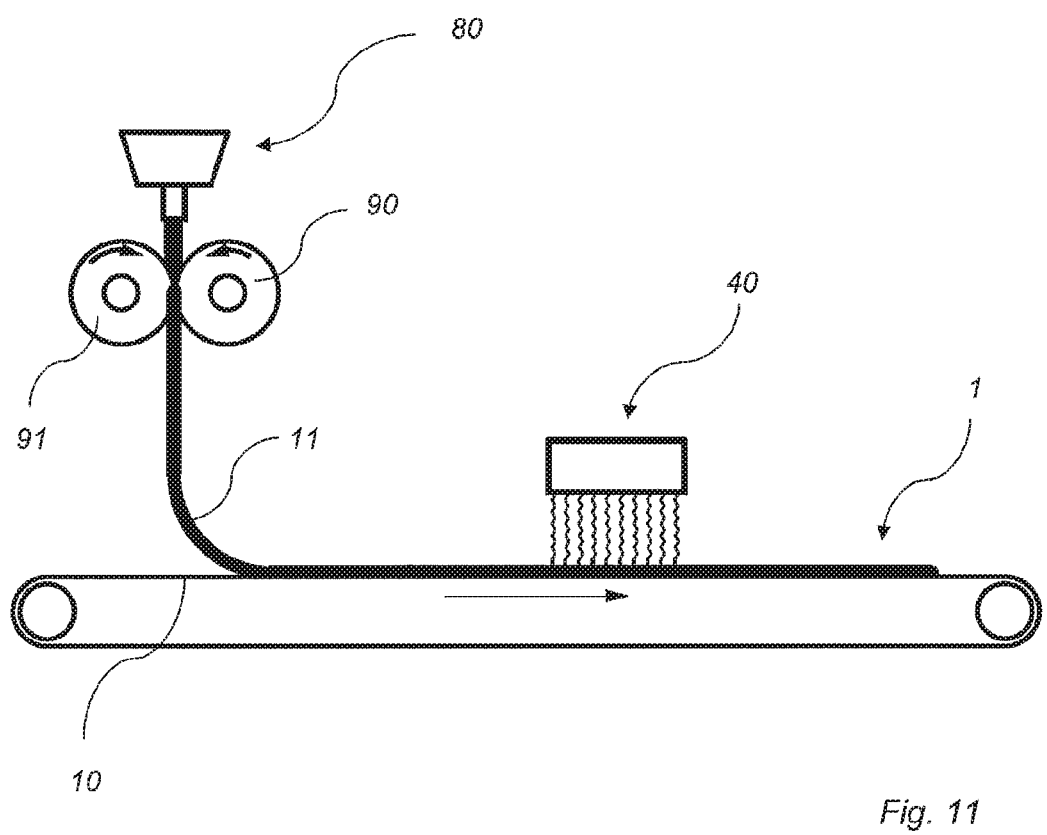
FIG. 11 illustrates an alternative method of manufacturing a layer.

FIG. 11 discloses an alternative method for forming a powder mix layer 1. In this embodiment, moisture 31 is applied to the powder mix 2 of the above described type in a container 80. A powder mix paste 11 is thereby formed. By applying moisture 31, the binder 3 becomes tacky and starts to bind the fibres 4 to each other. The powder mix paste 11 is thereafter extruded, for example by passing between a pair of rollers 90, 91. Heat is applied to the extruded powder mix paste 11. Heat may be applied by IR heating 40, or by the rollers 90, 91 being heated. The binder 3 thereby further binds the fibres 4 to each other when heat is applied such that a powder mix layer 1 is formed.

The powder mix layer 1 may also be separated into smaller parts forming decorative elements and be added to a surface layer. The decorative elements can be applied to a surface layer, for instance a wood fibre powder layer forming a surface layer of a building panel. Alternatively, the decorative elements are mixed with a wood fibre powder and applied to a core with the mix. The decorative elements are cured when added to the surface layer but cures simultaneously as curing the wood fibre powder layer takes place. A desired design can be created by adding different decorative elements to a surface layer.

Example 1

A powder mix comprising 35 wt-% wood fibres (Jelucel HM 150), 45 wt-% melamine formaldehyde resin (Kuramine 773), wear resistant particles in form of 10 wt-% aluminum oxide (Alodur ZWSK 180-ST) and 10 wt-% titan dioxide (Kronor 2190) was mixed.

The powder mix was scattered on the conveyor belt by means of the scattering unit. 400-800 g/m$^2$ of the powder mix, in one specific example 500 g/m$^2$ was scattered on the conveyor belt to a thickness of 1.5-3 mm.

Water is applied to the powder mix, wherein the water includes a wetting agent in form of 1 wt-% BYK-345 (aq). 40 g/m$^2$ of water was added to the powder mix as small drops applied to the powder mix by means of a spraying device. The moisture makes the binder sticky which have the effect of the fibres being connected to each other.

Infrared light (IR) was used to vaporize and dry the powder such that the water is at least partly removed from the powder mix. IR was applied by an effect of 19 kW/m and a line speed of 2.7 m/min. By removing the moisture, the binder further binds the fibres to each other such that a separate and continuous powder mix layer is formed.

Example 2 (Prophetic Example)

A powder mix layer of example 1 was further processed by applying pressure to the powder mix layer. Pressure was applied by means of a roller providing a pressure of 2-20 kg/cm$^2$, as a specific example 10 kg/cm$^2$.

Thereby, a powder mix layer having a smooth surface was obtained.

Example 3 (Prophetic Example)

A cellulose based non-woven sheet (Wetlaid 617 70 000, 70 g/m$^2$ from Scandinavian Non-woven AB), was guided into a container containing water such that the non-woven is wetted. The water includes a wetting agent in form of 1 wt-% BYK-345 (aq).

A powder mix comprising 35 wt-% wood fibres (Jelucel HM 150), 45 wt-% melamine formaldehyde resin (Kuramine 773), wear resistant particles in form of 10 wt-% aluminum oxide (Alodur ZWSK 180-ST) and 10 wt-% titan dioxide (Kronor 2190) was mixed. The powder mix is applied to the non-woven sheet by means of two scattering devices. The scattering devices are adapted to scatter the powder mix on both sides of the non-woven sheet. Since the non-woven sheet is wetted, the powder mix adheres to the non-woven sheet, since the moisture gets the binder to become sticky. 125 g/m$^2$ of powder mix is applied to each side of the non-woven sheet. Heat is applied to the non-woven sheet to further stabilize the powder mix on the non-woven. The non-woven sheet is then cut into separate sheets forming a separate and continuous powder mix layer.

Example 4

A powder mix comprising 35 wt-% wood fibres (Jelucel HM 150), 45 wt-% melamine formaldehyde resin (Kuramine 773), wear resistant particles in form of 10 wt-% aluminum oxide (Alodur ZWSK 180-ST) and 10 wt-% titan dioxide (Kronos 2190) was mixed.

The powder mix was scattered on a cellulose based non-woven sheet (Wetlaid 617 70 000, 70 g/m$^2$ from Scandinavian Non-woven AB) by means of the scattering unit. 250-500 g/m$^2$ of the powder mix may scattered. In one specific example 125 g/m$^2$ powder mix was scattered on each side of the non-woven to a thickness of 0.5-1.5 mm, for a total of 250 g/m$^2$ on the non-woven sheet.

Water is applied to the powder mix, wherein the water includes a wetting agent in form of 1 wt-% BYK-345 (aq). 40 g/m$^2$ of water was added to the powder mix as small drops applied to the powder mix by means of a spraying device. The moisture makes the binder sticky which have the effect of the fibres being connected to each other.

Infrared light (IR) was used to vaporize and dry the powder such that the water is at least partly removed from the powder mix. IR was applied by an effect of 19 kW/m and a line speed of 2.7 m/min. By removing the moisture, the binder further binds the fibres to each other such that a separate and continuous powder mix layer is formed including the non-woven sheet.

Example 5 (Prophetic Example)

A powder mix comprising 35 wt-% wood fibres (Jelucel HM 150), 45 wt-% melamine formaldehyde resin (Kuramine 773), wear resistant particles in form of 10 wt-% aluminum oxide (Alodur ZWSK 180-ST) and 10 wt-% titan dioxide (Kronos 2190) was mixed.

The powder mix is mixed with 10 wt-% water to form a paste. The water includes a wetting agent in form of 1 wt-% BYK-345 (aq). The binder in the mix becomes sticky due to the water applied. The paste is extruded by passing between two rollers to a sheet having a thickness of 0.5-5 mm. The sheet is guided on a conveyor belt.

The powder mix is further stabilized by heating the powder mix. By applying heat, the powder mix is dried such that the binder further binds the fibres to each other. Heat is applied by IR heating with an effect of 19 kW/m and a line speed of 2.7 m/min. The conveyor belt is also heated such that the extruded powder mix is heated from below. Thereby, a separate and continuous powder mix layer is formed.

It is contemplated that there are numerous modifications of the embodiments described herein, which are still within the scope of the invention as defined by the appended claims.

It is for example contemplated that the semi-finished layer does not have to be arranged on a core to form a surface layer. Alternatively, a plurality of layers bound to each other may form a building panel.

It is also contemplated that the powder mix layer may pass a roller in order to form an especially even and smooth surface. Alternatively, by applying the powder mix to a carrier having an even and smooth surface, the side of the powder mix layer facing the carrier will also be provided with a smooth and even surface. Thereby, a powder mix layer having surfaces provided with different surface properties will be provided. As an alternative, the carrier may be provided with a pattern to form a pattern in the powder mix layer facing the carrier.

In the above disclosure, drying of the powder mix has been achieved by applying heat. However, a person skilled in the art realizes that the powder mix may be dried by other means, for example by applying vacuum or superheated steam.

The invention claimed is:

1. A method of manufacturing a layer, comprising
applying a powder mix comprising fibres and a binder on a surface of a supporting layer, wherein the fibres and binder are mixed to form the powder mix prior to the powder mix being applied to the surface of the supporting layer, and wherein the supporting layer is arranged on a carrier,
permanently connecting the powder mix to the supporting layer by applying moisture on the powder mix such that the powder mix is connected together by the binder to thereby create an essentially uncured layer comprised of the powder mix and the supporting layer, and
releasing the essentially uncured layer from the carrier to thereby manufacture a separate, semi-finished and continuous layer.

2. The method according to claim 1, wherein the supporting layer is a paper sheet.

3. The method according to claim 2, wherein the paper sheet is impregnated.

4. The method according to claim 1, wherein the supporting layer is a non-woven sheet.

5. The method according to claim 1, wherein the supporting layer is one of a rice sheet, a sugar paper, a netting, mineral fibres, carbon fibres, textile fibres or nylon fibres.

6. The method according to claim 1, wherein the binder is a thermosetting binder.

7. The method according to claim 1, wherein the binder is a thermoplastic binder.

8. The method according to claim 1, wherein the step of permanently connecting the powder mix includes drying the powder mix such that the powder mix is connected together.

9. The method according to claim 1, wherein the powder mix layer is flexible.

10. The method according to claim 1, further comprising curing the separate, semi-finished and continuous layer before being applied to a core.

11. The method according to claim 1, further comprising applying the separate, semi-finished and continuous layer to a core.

12. The method according to claim 11, wherein the separate, semi-finished and continuous layer is attached to the core by an adhesive.

13. The method according to claim 1, wherein the fibres are wood fibres, plastic fibres, mineral fibre or vegetable fibres, or a mixture thereof.

14. The method according to claim 1, further comprising printing a print in the powder mix and/or powder mix layer.

15. The method according to claim 14, wherein the printing is by digital printing.

16. The method according to claim 1, wherein the connecting of the powder mix to the supporting layer further comprises applying heat and/or pressure.

17. The method according to claim 1, wherein the binder is a combination binder including both thermoplastic and thermosetting properties.

18. The method according to claim 1, wherein the moisture is applied to a predetermined portion of the powder mix to create a predetermined shape in the powder mix, and wherein the method further comprises separating the portion of the powder mix exposed to the moisture from those not exposed to the moisture.

19. A method of manufacturing a layer attached to a wood-based core, comprising
applying uncured particles on a surface of a supporting layer, wherein the supporting layer is an impregnated paper sheet and arranged on a carrier,
applying moisture on the particles or on the supporting layer such that the particles are connected together and are permanently connected to the supporting layer, thereby forming an essentially uncured layer comprised of the uncured particles and the impregnated paper sheet,
removing the essentially uncured layer from the carrier to thereby manufacture a separate, semi-finished and continuous layer, and
attaching the separate, semi-finished and continuous layer to a wood-based core selected from the group consisting of MDF, HDF, OSB, WPC and particleboard.

20. The method according to claim 19, wherein the particles comprises wood particles.

21. The method according to claim 19, wherein the particles comprises a binder.

22. The method according to claim 21, wherein the binder is a thermosetting binder.

23. The method according to claim 21, wherein the binder is thermoplastic binder.

24. A method of manufacturing a layer, comprising
applying a powder mix comprising fibres and a thermosetting binder on a surface of a supporting layer, wherein the supporting layer is arranged on a carrier,
applying moisture on the powder mix such that the powder mix is connected together, forming a powder mix layer, the powder mix layer being permanently connected to the supporting layer,
removing the powder mix layer and the supporting layer from the carrier to create a separate, semi-finished and continuous layer,
curing the separate, semi-finished and continuous layer to create a cured powder mix layer on the supporting layer, and
after curing, attaching the cured powder mix layer on the supporting layer to a core, thereby manufacturing a layer which is comprised of the cured powder mix layer, the supporting layer, and the core,
wherein the fibres and thermosetting binder are mixed to form the powder mix prior to the powder mix being applied to the surface of the supporting layer.

25. The method according to claim 24, wherein the supporting layer is a paper sheet.

26. The method according to claim 25, wherein the paper sheet is impregnated.

27. The method according to claim 24, wherein the supporting layer is a non-woven sheet.

28. A method of manufacturing a layer, comprising
applying a powder mix comprising fibres and a binder on a surface of a supporting layer, wherein the supporting layer is arranged on a carrier,
applying moisture on the powder mix such that the powder mix is connected together by the binder to thereby create a layer comprised of the powder mix and the supporting layer,
applying heat to the layer comprised of the powder mix and the supporting layer at a temperature below the curing temperature of the binder to form a heated layer that is continuous, flexible and comprised of the powder mix and supporting layer, and
removing the heated layer from the carrier to create a separate, continuous and flexible layer,
wherein the fibres and binder are mixed to form the powder mix prior to the powder mix being applied to the surface of the supporting layer.

29. The method according to claim 28, wherein the fibres comprise wood fibres.

30. The method according to claim 28, wherein the binder is a thermosetting binder.

\* \* \* \* \*